(12) United States Patent
Azar (10) Patent No.: US 9,785,146 B2
(45) Date of Patent: Oct. 10, 2017

(54) MANEUVER PLANNING WITH HIGHER ORDER RATIONAL BEZIER CURVES

(71) Applicant: Michel M. Azar, San Diego, CA (US)

(72) Inventor: Michel M. Azar, San Diego, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 50 days.

(21) Appl. No.: 15/006,876

(22) Filed: Jan. 26, 2016

(65) Prior Publication Data
US 2017/0213466 A1 Jul. 27, 2017

(51) Int. Cl.
*G05D 1/00* (2006.01)
*G05D 1/08* (2006.01)
*G05D 1/02* (2006.01)
*G05D 1/10* (2006.01)
*G08G 5/00* (2006.01)
(Continued)

(52) U.S. Cl.
CPC ......... *G05D 1/0088* (2013.01); *B64C 39/024* (2013.01); *G01C 21/20* (2013.01); *G05D 1/0212* (2013.01); *G05D 1/0816* (2013.01); *G05D 1/0825* (2013.01); *G05D 1/101* (2013.01); *G08G 5/0034* (2013.01); *G08G 5/0069* (2013.01);
(Continued)

(58) Field of Classification Search
CPC .. G05D 1/0088; G05D 1/0816; G05D 1/0212; G05D 1/0825; G05D 1/101; G08G 5/0034; G08G 5/0069; G01C 21/20; B64C 39/024
See application file for complete search history.

(56) References Cited

U.S. PATENT DOCUMENTS 5,241,654 A * 8/1993 Kai ................. G06T 11/203
345/442
5,367,617 A * 11/1994 Goossen ............ G06T 11/203
345/442
(Continued)

OTHER PUBLICATIONS

Boonporm: "*Online Path Replanning of Autonomous Mobile Robot with Spline Based Algortihm*", International Conference on System Modeling and Optimization vol. 23, 2012.
(Continued)

*Primary Examiner* — Dale W Hilgendorf
(74) *Attorney, Agent, or Firm* — Tarolli, Sundheim, Covell & Tummino LLP (57) ABSTRACT

Systems and methods are provided for generating a maneuver on a propagated route for an unmanned vehicle from a series of waypoints. A planner interface is configured to receive the waypoints and at least one parameter representing constraints on the propagated route of the unmanned vehicle. A curve generation component is configured to determine respective positions for each of a set of N+1 control points for a rational Bezier curve of $N^{th}$ order from the series of waypoints and the parameter. N is an integer greater than three. A weight generation component is configured to determine scalar weights for the set of N+1 control points from the parameter. A navigation interface is configured to provide the maneuver, generated from the positions for the set of control points and the scalar weights, to a control system of the unmanned vehicle, configured to execute the provided maneuver at the unmanned vehicle.

14 Claims, 3 Drawing Sheets

(51) Int. Cl.
  *B64C 39/02*   (2006.01)
  *G01C 21/20*   (2006.01)
(52) U.S. Cl.
  CPC .. *B64C 2201/126* (2013.01); *B64C 2201/141* (2013.01); *B64C 2201/146* (2013.01)

(56) References Cited

U.S. PATENT DOCUMENTS

| | | | | |
|---|---|---|---|---|
| 7,228,227 B2 * | 6/2007 | Speer | ................. | G05D 1/101 |
| | | | | 701/467 |
| 2011/0029235 A1 * | 2/2011 | Berry | ................. | G08G 5/0069 |
| | | | | 701/408 |
| 2011/0285719 A1 * | 11/2011 | Kilgard | ................. | G06T 11/203 |
| | | | | 345/442 |

OTHER PUBLICATIONS

M.I. Lizarraga, et al.: "*Spatially Deconflicted Path Generation for Multiple UAVs in a Bounded Airspace*", ION/IEEE Position, Location, and Navigation Symposium, ION/IEEE Plans 2008.

* cited by examiner

MANEUVER PLANNING WITH HIGHER ORDER RATIONAL BEZIER CURVES

TECHNICAL FIELD

The present invention relates generally to unmanned vehicles, and more particularly to maneuver planning using higher order rational Bezier curves.

BACKGROUND

An uncrewed vehicle or unmanned vehicle is a vehicle that operates without a person on board. Uncrewed vehicles can either be remote controlled or remote guided vehicles, or they can be autonomous vehicles which are capable of sensing their environment and navigating on their own. Unmanned vehicles have mostly found military and special operation applications, but also are increasingly finding uses in civil applications, such as policing, surveillance and firefighting, and nonmilitary security work, such as inspection of power or pipelines. Unmanned vehicles are often preferred for missions that are too "dull, dirty or dangerous" for manned vehicles. The control system of the unmanned vehicle is configured to execute the provided maneuver at the unmanned vehicle.

SUMMARY

In accordance with one aspect of the present invention, a system is provided for generating a maneuver on a propagated route for an unmanned vehicle from a series of waypoints. A mission planner is configured to generate a series of waypoints, representing a route to be travelled by the unmanned vehicle, and at least one parameter representing constraints on the propagated route of the unmanned vehicle. A route generation system includes a planner interface configured to receive the series of waypoints and at least one parameter representing constraints on the propagated route of the unmanned vehicle. A curve generation component is configured to determine respective positions for each of a set of N+1 control points for a rational Bezier curve of $N^{th}$ order from at least the series of waypoints and the at least one parameter, where N is an integer greater than three. A weight generation component is configured to determine scalar weights for the set of N+1 control points from the at least one parameter. A navigation interface is configured to provide the maneuver, generated from the positions for the set of N+1 control points and the scalar weights, to a control system of the unmanned vehicle.

In accordance with another aspect of the present invention, a method is provided for generating a maneuver on a propagated route for an unmanned vehicle from a series of waypoints and at least one parameter representing constraints on the propagated route of the unmanned vehicle. Scalar weights are determined for a set of N+1 control points from the at least one parameter, where N is an integer greater than three. Respective positions are determined for each of the set of N+1 control points for a rational Bezier curve of $N^{th}$ order from at least the series of waypoints and the at least one parameter. A set of points are determined representing the rational Bezier curve from the set of N+1 control points and the scalar weights. The set of points representing the rational Bezier curve, are provided to a navigation system associated with the unmanned vehicle. The maneuver, represented by the set of points representing the rational Bezier curve, is then executed at the unmanned vehicle.

In accordance with yet another aspect of the present invention, a method is provided for generating a maneuver on a propagated route for an unmanned air vehicle from a series of three waypoints and at least one parameter representing constraints on the propagated route of the unmanned air vehicle. Respective positions are determined for each of a set of five control points for a quartic rational Bezier curve from at least the series of three waypoints and the at least one parameter. Scalar weights are determined for the set of five control points from the at least one parameter. A set of points representing the rational Bezier curve from the set of five control points and the scalar weights. The set of points is provided to a navigation system configured to control the unmanned vehicle based on the propagated route.

DETAILED DESCRIPTION

Part of mission or route planning for an unmanned vehicle, such as an unmanned air vehicle (UAV), is the generation of a "propagated route" from defined waypoints, corridor width, and kinematic constraints along which a vehicle will robustly and smoothly navigate. The "propagated route" is based on a well-defined "stick route" that consists of a series of waypoints connected by straight-line segments. Since unmanned vehicles, in general, have kinematic and dynamic constraints on their movement, they cannot navigate a stick route at reasonable speeds. Instead, a continuous curvature path, the propagated route, is generated. In the propagated route, regions of transitions between line segments can be replaced with maneuvers, in which the vehicle departs from the stick route to provide a continuous transition.

A given maneuver is generally performed at a waypoint at which two segments of the stick route intersect at a sharp angle. The inventors have determined that curvature continuity can be maintained for curves having an arbitrary position relative to the waypoint of intersection only if a quartic or higher rational Bezier curve is utilized. For lower order curves, curvature continuity cannot be guaranteed for maneuvers in which the intersecting waypoint lies inside of or on the Bezier curve representing the path of the maneuver. To this end, the inventors have determined an efficient means for determining control points and scalar weights for quartic and higher order rational Bezier curves for use in planning continuous maneuvers having an arbitrary relationship to an intersecting waypoint.

Figure 1:
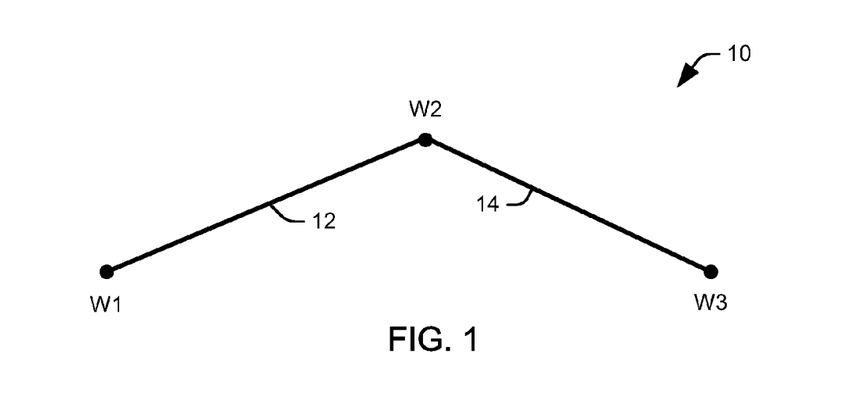
FIG. 1 illustrates a portion of a route for an unmanned vehicle defined by three waypoints.

FIG. 1 illustrates a portion of a stick route 10, specifically a portion of the route defined by three waypoints, W1, W2, and W3, for an unmanned vehicle. A first segment 12 runs from W1 to W2 and a second segment 14 runs from W2 to W3, such that they intersect at W2. It will be appreciated that navigating the stick route, as it is presented, would require a sharp turn at W2. As part of the route planning, it is necessary to determine how to maneuver around the intersecting waypoint as to generate a smooth curve joining the two straight-line segments. In accordance with an aspect of the present invention, the curve is subject to a number of constraints. To begin with, a set of kinematic and dynamic constraints associated with the unmanned vehicle must be satisfied, such that the course does not require the vehicle to accelerate, turn, or travel at a rate that is unsafe, resource inefficient, or impossible for the vehicle.

In addition, the maneuver must start at a point located on the first segment 12 that is within a specified distance from the intersecting waypoint, W2. This is referred to as a maneuver start distance. Similarly, the maneuver must end on a point located on the second segment 14 that is within specified distance from W2, referred to as the maneuver end distance. Finally, the intersecting waypoint can be inside, on, or outside the generated curve and must be at a specified distance from an extremum of the curve.

The inventors have determined that a propagated route having the desired properties can be created using a Bezier curve of quartic or higher order. A Bezier curve is a parameterized (over time) polynomial or rational curve whose shape and geometric properties are completely determined by a set of control points. A rational Bezier curve is a generalization of a polynomial Bezier curve in which each control point is assigned a positive scalar weight. The larger the weight of a control point, the closer the Bezier curve is to that control point. A Bezier curve of degree n, has n+1 control points, P0, P1, . . . , Pn. A Bezier curve always passes through the end control points, and it is tangent to the end control segments. If end control segments are properly chosen, this property ensures curvature continuity at the end control points. The Bezier curve always lies within the convex hull of the control points, and the generated points comprising the curve are not uniformly distributed over the parameter interval, that is, the transfer time interval representing the duration of the maneuver. Instead, the point density increases with sharper curvature. Accordingly, for a given time increment, the distance, and hence the speed, between two consecutive points decreases as the curvature increases.

Figure 2:
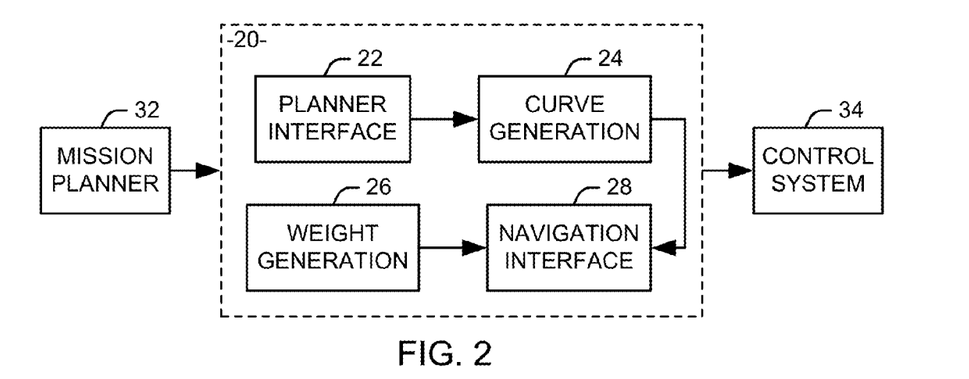
FIG. 2 illustrates one example of a system for generating a maneuver on a propagated route for an unmanned vehicle from a series of waypoints.

FIG. 2 illustrates one example of a route generation system 20 for generating a maneuver on a propagated route for an unmanned vehicle from a series of waypoints. It will be appreciated that the system 20 can be implemented as dedicated hardware, such as an application specific integrated circuit, firmware on a dedicated hardware device, or as software or programmable digital logic. In one implementation, the system could be implemented as a content addressable memory (CAM) in a field programmable gate array (FPGA) or similar device. Alternatively, the system 20 could be implemented as software instructions and executed by a general purpose processor. The system 20 can be implemented on the unmanned vehicle or on a separate system in communication with the unmanned vehicle.

A planner interface 22 is configured to receive the series of waypoints and at least one parameter representing constraints on the propagated route of the unmanned vehicle from an associated mission planner 32. In one implementation, the planner interface 22 comprising a user interface configured to receive the series of waypoints and the at least one parameter from a human user. Alternatively, the planner interface 22 can receive data from an automated or semi-automated expert system, such as a mission planner, and appropriately format the received data for analysis.

It will be appreciated that the parameters representing mission constraints can vary depending on the nature of the unmanned vehicle (e.g., air, ground, sea). Exemplary parameters can include a maneuver start distance, representing the distance from a given waypoint, for example, a second waypoint, at which the maneuver should begin, or put differently, when it is permissible for the vehicle to depart from the straight line path between the given waypoint and the previous waypoint, and a maneuver end distance representing a distance from the given waypoint for which the maneuver should end. A corridor width defines the distance for which it is permissible for the vehicle to depart from this straight line path in the course of the maneuver. Kinematic parameters of the vehicle, such as an initial speed and tangential acceleration can also be provided, along with parameters representing the capabilities of the vehicle itself, such as maximum safe accelerations, turn radius, and similar parameters. The most common maneuver from a vehicle for which the system 20 is relevant would be a smooth turn from a path between first and second waypoints to a path between second and third waypoints, and this will be the focus of the example below. It will be appreciated, however, that the system 20 can be applied to more complex maneuvers over an arbitrary number of waypoints.

Once the waypoints and parameters have been received, they are provided to a curve generation component 24. The curve generation component 24 is configured to determine respective positions for each of a set of N+1 control points for a rational Bezier curve of $N^{th}$ order from at least the series of waypoints and the at least one parameter. In accordance with an aspect of the present invention, N is an integer greater than three. Specifically, the inventors have determined that the use of a quartic or higher order rational Bezier curve allows for a propagated route for the vehicle having curvature continuity, that is, a path for which the control points are substantially uniformly distributed with respect to the time necessary to perform the maneuver.

The curve generation component 24 is configured to determine the positions for each of the first and the second control points to lie on a line segment between a first waypoint and a second waypoint of the series of waypoints and to determine the positions of each of the $N^{th}$ control point and the $(N+1)^{st}$ control point to lie on a line segment between a penultimate waypoint and a final waypoint of the series of waypoints. In one implementation, the at least one parameter includes a maneuver start distance and a maneuver end distance, and the curve generation component 14 is configured to determine the position of the first control point from the maneuver start distance and to determine the position of the last control point from the maneuver end distance. In one example, using three waypoints, the second control point is separated from the second waypoint by the maneuver start distance and the penultimate control point is separated from the second waypoint by the maneuver end distance. The position of one or more other control points can be controlled by another parameter, representing a desired distance between the curve and one of the waypoints.

A weight generation component 26 is configured to determine scalar weights for the set of N+1 control points from the at least one parameter. In general, the weights are determined by conditions imposed by kinematic or dynamic constraints on the unmanned vehicle (e.g., initial or boundary conditions). In one implementation, the weight generation component 26 is configured to determine the scalar weights such that a extremum point of the rational Bezier curve occurs halfway through the expected duration and along a median of a triangle defined by a given waypoint of the series of waypoints, a first control point of the set of N+1 control points, and a final control point of the set of N+1 control points. To this end, the weights can have interrelations that restrict the free selection of their values. Specifically, the weight generation component 26 can be configured to determine a set of at least two of the scalar weights directly from the at least one parameter and to determine each of the scalar weights not belonging to the set of at least two scalar weights as either a default value or a function of the set of at least two of the scalar weights. For example, the weight generation component 26 can determine a scalar weight corresponding to a penultimate control point of the set of N+1 control points as a function of a scalar weight corresponding to a second control point of the set of N+1 control points and a ratio of the maneuver start distance to the maneuver end distance.

A navigation interface 28 is configured to generate a maneuver from the positions for the set of N+1 control points and the scalar weights and provide it to a control system 34 of the unmanned vehicle. To this end, a transfer time interval can be uniquely found from the initial speed, that is, the speed at the start of the maneuver and the scalar weights. Similarly, the position, velocity, acceleration, and curvature profiles will be readily computed from the control points and the scalar weights and provided to the vehicle control. Accordingly, a planned maneuver can be quickly and efficiently provided to the vehicle for execution by the control system 34.

Figure 3:
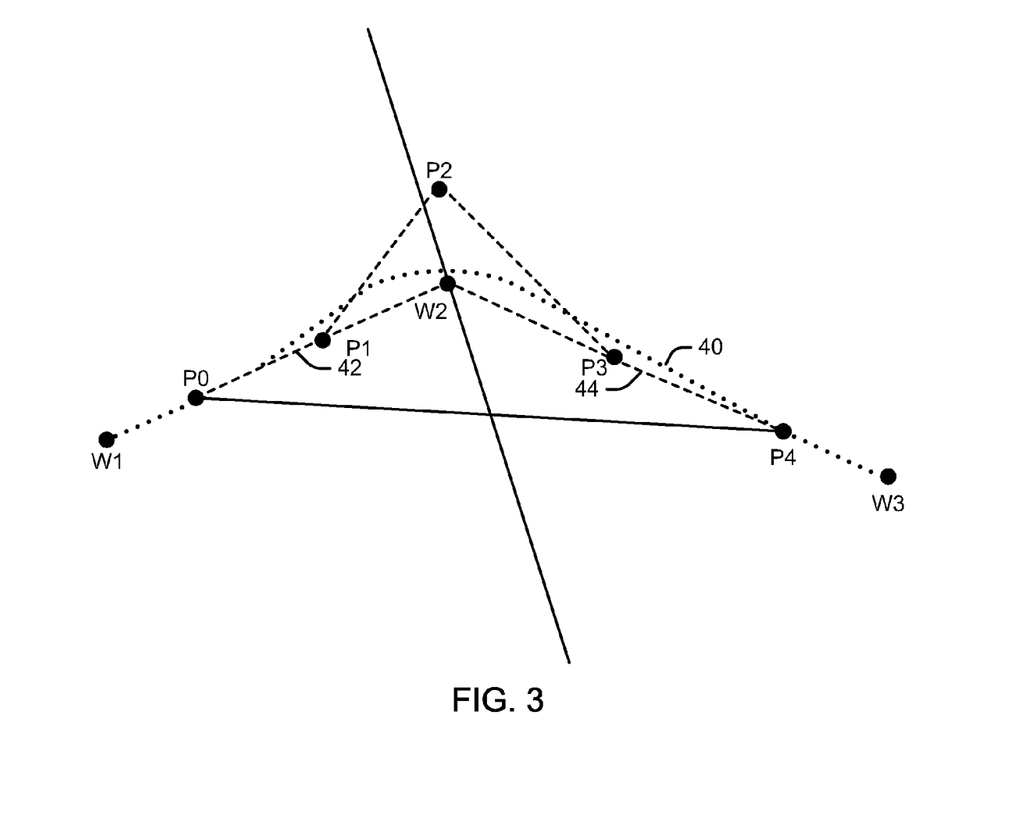
FIG. 3 illustrates a quartic rational Bezier curve used to provide a maneuver associated with three waypoints for an unmanned air vehicle.

In one example, illustrated in FIG. 3, a quartic rational Bezier curve 40 is used to provide a maneuver associated with three waypoints, W1-W3, for an unmanned air vehicle (UAV). A stick route defined by the waypoints includes a first line segment 42 between the first and second waypoints and a second line segment 44 between the second and third waypoints. The system 20 selects five control points, P0, P1, P2, P3, and P4, and their corresponding scalar weights to ensure that a smooth curve with appropriate properties, arbitrary placement relative to the second waypoint, and kinematic and dynamic properties appropriate to the UAV. To this end, the first and second control points, P0, P1 are chosen to lie on the first line segment 42, with P0 at the specified maneuver start distance, d20, and P1 halfway between the second waypoint, W2, and P0. The fourth and fifth control points, P3 and P4 are chosen to lie on the second line segment 44, with P4 at the specified maneuver end distance, d24, and P3 halfway between W2 and P4. Choosing P0 and P1 to lie on the first line segment 42 and P3 and P4 to lie on the second line segment 44 guarantees smoothness and curvature continuity both at the start and end of the maneuver, as well greatly simplifies the math involved in determining the third control point P2 and the scalar weights.

The position of the third control point, P2, is determined by the parameter requiring W2 to be a specified distance from the Bezier curve 40. In this example, W2 is inside of the Bezier curve 40, although, as mentioned previously, the systems and methods described herein allow for arbitrary placement of the curve relative to the second waypoint. The scalar weights, w0, w1, w2, w4, are determined by either default values or conditions imposed by the UAV kinematic or dynamic constraints. For this example, these conditions include a maneuver start distance, d20, of 1.5 km, a maneuver end distance, d24, of 2 km, an initial speed of 300 knots, no initial tangential acceleration, a corridor width of 400 m, and a distance between the intersecting waypoint, W2 and the maximum point of the Bezier curve, d22, of 100 m, with the positive value indicating that the intersecting waypoint is within the Bezier curve. It will be appreciated that by "within the Bezier curve", it is meant that the waypoint is not on the curve, and it is not possible to draw a line passing through the waypoint that does not pass through the curve. In the illustrated implementation, the weights w0 and w4 are set at a default value of 1, the weight w2 is set as a function of the distance between the intersecting waypoint, W2 and the maximum point of the Bezier curve at 2.2431, and w1 is set as a function of one or more of the UAV kinematic and dynamic constraints as 1.5.

Once the first two control points P0 and P1, the last two control points, P3 and P4, have been established, a position of the middle control point, P2, is selected so that waypoint, W2, is precisely at the specified distance from the extremum point of the Bezier curve, which in turn depends on all the control points, including control point P2. The inventors have found that the position of P2 can be determined by using the expression for the Bezier curve point at the middle of the time interval associated with the maneuver, P(1/2).

$$P(1/2)(w0P0+4(w1P1+w3P3)+6w2P2+w4P4)/w0+4(w1+w3)+6w2 \qquad \text{Eq. 1}$$

If the maneuver start and end distances are equal, (d20=d24), then the Bezier curve would be symmetric about waypoint, W2, and both P(1/2) and P2 would lie on a median line (which in this case is also the bisector) connecting waypoint, W2, and the midpoint of the base P0-P4 of the isosceles triangle defined by the points P0, W2, and P4. In this case, P(1/2) is also the maximum point of the Bezier curve.

In the present example, however, the maneuver start and end distances are not equal. To this end, W3 can be selected such that P(1/2) lies along the median of the triangle defined by P0, W2, and P4 and the maximum point of the Bezier curve can still occur at P(1/2). To this end, the inventors have determined that the following relationship can be enforced among the scalar weights w0, w1, w3, and w4:

$$(w1+w0/2)d20=(w3+w4/2)d24 \qquad \text{Eq. 2}$$

Plugging in the default values of 1 for w0 and w4, w3 can be expressed in terms of w1 and the maneuver start and end distances as:

$$w3 = \left(w1 + \frac{1}{2}\right)\left(\frac{d20}{d24}\right) - \frac{1}{2} \qquad \text{Eq. 3}$$

Expressing P(1/2) in terms of the unit vector, û, along the median line, W2-M, and d22, the specified distance to waypoint:

$$P(1/2)=d22\hat{u} \qquad \text{Eq. 4}$$

Given the values for the weights and the positions of the other control points, the position of P2 can be calculated from Eqs. 1 and 4.

In practice, the geodetic coordinates (latitude, longitude, altitude) of the "stick route" waypoints, W1, W2, and W3 are converted to geocentric coordinates (X, Y, Z) in the Earth-Centric-Earth Fixed (ECEF) coordinates system, and these are used to compute the Bezier control points (P0, P1, P2, P3, P4) and the scalar weights. The Bezier curve points, P(t) for 0.0<=t<=1.0, are generated once the scalar weights have been determined and the transfer time has been computed. For an initial speed, $v_0$, the transfer time interval is given by $$\frac{2w1d20}{w0v_0}.$$

The main advantage of this approach over other approaches is that it allows for a single curve to simulate the maneuver around a waypoint subject to physical and kinematic constraints. The imposed curve physical constraints, i.e. the maneuver start and end distances, the position of the Bezier curve (maximum point) relative to a waypoint, and the corridor width, together with the invariant relationship between the scalar weights, result in a general but simple mathematical construction of the control points that allows the Bezier curve to be easily positioned at the specified distance relative to the waypoint. The imposed UAV kinematic constraints are used to uniquely determine the weights w1 and w2 as discussed above. Similarly to the traditional approaches, this approach also guarantees curvature continuity at all points of the curve including the maneuver start and end points In view of the foregoing structural and functional features described above, methodologies will be better appreciated with reference to FIG. 4. It is to be understood and appreciated that the illustrated actions, in other embodiments, may occur in different orders and/or concurrently with other actions. Moreover, not all illustrated features may be required to implement a method.

Figure 4:
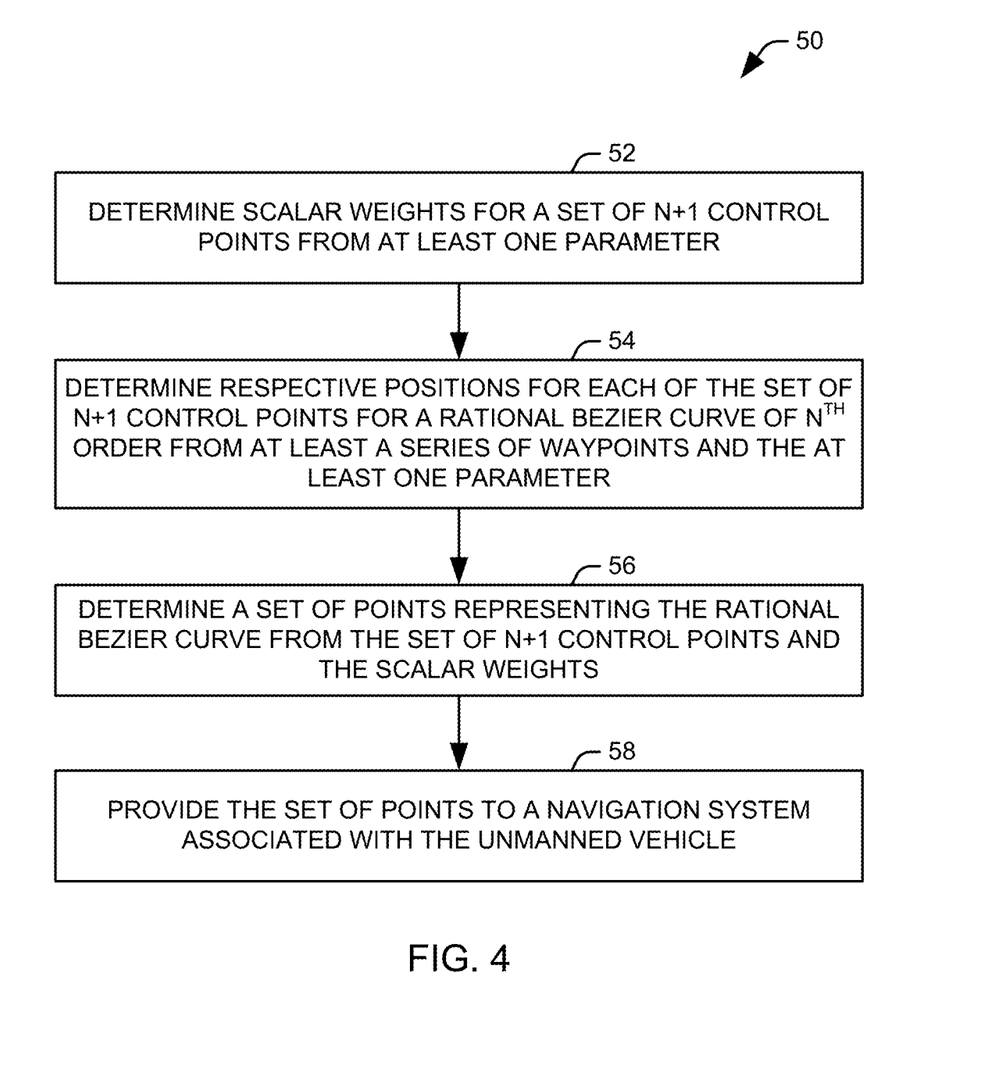
FIG. 4 illustrates a method for generating a maneuver on a propagated route for an unmanned air vehicle from a series of waypoints and at least one parameter representing constraints on the propagated route of the unmanned vehicle.

FIG. 4 illustrates a method 50 for generating a maneuver on a propagated route for an unmanned air vehicle from a series of waypoints and at least one parameter representing constraints on the propagated route of the unmanned vehicle. At 52, scalar weights are determined for a set of N+1 control points from the at least one parameter. In accordance with an aspect of the invention, N is an integer greater than three. In one implementation, the scalar weights are determined such that a extremum point of the rational Bezier curve occurs halfway through the expected duration and along a median of a triangle defined by a given waypoint of the series of waypoints, a first control point of the set of N+1 control points, and a final control point of the set of N+1 control points. To this end, a set of at least two of the scalar weights can be determined directly from the parameters, and each of the scalar weights not belonging to the set of at least two scalar weights can be determined as one of a default value and a function of the set of at least two of the scalar weights. In one example, a scalar weight corresponding to a penultimate control point of the set of N+1 control points is determined as a function of a scalar weight corresponding to a second control point of the set of N+1 control points and a ratio of the maneuver start distance to the maneuver end distance.

At 54, respective positions are determined for each of the set of N+1 control points for a rational Bezier curve of $N^{th}$ order from at least the series of waypoints and the at least one parameter. In one implementation, the parameters includes a desired distance between an extremum of the curve and a given waypoint of the series of waypoints, and the position of at least one control point can be determined from at least the desired distance between the extremum of the curve and the given waypoint.

Additionally or alternatively, the parameters can include each of a maneuver start distance and a maneuver end distance, a first control point and a second control points are determined to lie on a line segment between a first waypoint and a second waypoint of the series of waypoints, with the first control point at the maneuver start distance from the second waypoint, and each of an $N^{th}$ control point and a last control point are determined to lie on a line segment between a penultimate waypoint and a final waypoint of the series of waypoints with the last control point at the maneuver end distance from the second waypoint. In this instance, the second control point can be positioned halfway between the first control point and the second waypoint and the $N^{th}$ control point located halfway between the last control point and the second waypoint.

At 56, a set of points representing the rational Bezier curve is determined from the set of N+1 control points and the scalar weights. Effectively, the set of Bezier curve points can be determined to represent the position of the vehicle at each time in the time interval associated with the maneuver. At 58, the set of points are provided to a navigation system associated with the unmanned vehicle.

Figure 5:
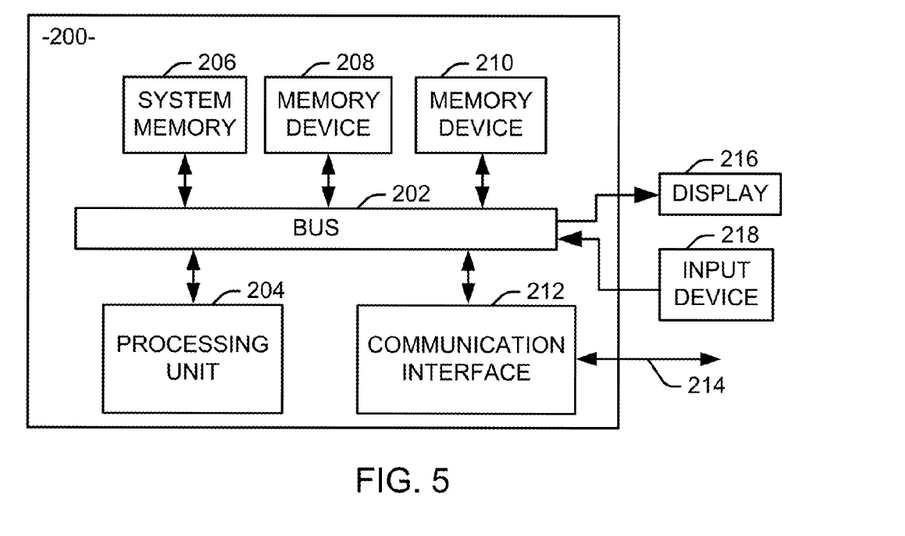
FIG. 5 illustrates a schematic block diagram of an exemplary operating environment for a system configured in accordance with an aspect of the invention.

FIG. 5 is a schematic block diagram illustrating an exemplary system 200 of hardware components capable of implementing examples of the systems and methods disclosed in FIGS. 1-4. The system 200 can include various systems and subsystems. The system 200 can be a personal computer, a laptop computer, a workstation, a computer system, an appliance, an application-specific integrated circuit (ASIC), a server, a server blade center, a server farm, etc.

The system 200 can includes a system bus 202, a processing unit 204, a system memory 206, memory devices 208 and 210, a communication interface 212 (e.g., a network interface), a communication link 214, a display 216 (e.g., a video screen), and an input device 218 (e.g., a keyboard and/or a mouse). The system bus 202 can be in communication with the processing unit 204 and the system memory 206. The additional memory devices 208 and 210, such as a hard disk drive, server, stand-alone database, or other non-volatile memory, can also be in communication with the system bus 202. The system bus 202 interconnects the processing unit 204, the memory devices 206-210, the communication interface 212, the display 216, and the input device 218. In some examples, the system bus 202 also interconnects an additional port (not shown), such as a universal serial bus (USB) port.

The processing unit 204 can be a computing device and can include an application-specific integrated circuit (ASIC). The processing unit 204 executes a set of instructions to implement the operations of examples disclosed herein. The processing unit can include a processing core.

The additional memory devices 206, 208 and 210 can store data, programs, instructions, database queries in text or compiled form, and any other information that can be needed to operate a computer. The memories 206, 208 and 210 can be implemented as computer-readable media (integrated or removable) such as a memory card, disk drive, compact disk (CD), or server accessible over a network. In certain examples, the memories 206, 208 and 210 can comprise text, images, video, and/or audio, portions of which can be available in formats comprehensible to human beings.

Additionally or alternatively, the system 200 can access an external data source or query source through the communication interface 212, which can communicate with the system bus 202 and the communication link 214.

In operation, the system 200 can be used to implement one or more parts of a navigation system in accordance with the present invention. Computer executable logic for implementing the system resides on one or more of the system memory 206, and the memory devices 208, 210 in accordance with certain examples. The processing unit 204 executes one or more computer executable instructions originating from the system memory 206 and the memory devices 208 and 210. The term "computer readable medium" as used herein refers to a medium that participates in providing instructions to the processing unit 204 for execution, and can include either a single medium or multiple non-transitory media operatively connected to the processing unit 204.

The invention has been disclosed illustratively. Accordingly, the terminology employed throughout the disclosure should be read in an exemplary rather than a limiting manner. Although minor modifications of the invention will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A system for generating a maneuver, having an expected duration, on a propagated route for an unmanned vehicle, the system comprising:
   a mission planner configured to generate a series of waypoints, representing a route to be travelled by the unmanned vehicle, and at least one parameter representing constraints on the propagated route of the unmanned vehicle;
   a route generation system comprising:
      a planner interface configured to receive the series of waypoints and the at least one parameter;
      a curve generation component configured to determine respective positions for each of a set of N+1 control points for a rational Bezier curve of $N^{th}$ order from at least the series of waypoints and the at least one parameter, where N is an integer greater than three;
      a weight generation component configured to determine scalar weights for the set of N+1 control points from the at least one parameter, including a maneuver start distance and a maneuver end distance, such that an extremum point of the rational Bezier curve occurs halfway through the expected duration and along a median of a triangle defined by a given waypoint of the series of waypoints, a first control point of the set of N+1 control points, and a final control point of the set of N+1 control points, with a scalar weight corresponding to a penultimate control point of the set of N+1 control points as a function of a scalar weight corresponding to a second control point of the set of N+1 control points and a ratio of the maneuver start distance to the maneuver end distance; and
      a navigation interface configured to provide the maneuver, generated from the positions for the set of N+1 control points and the scalar weights, to a control system of the unmanned vehicle; and
   the control system of the unmanned vehicle configured to execute the provided maneuver at the unmanned vehicle.

2. The system of claim 1, the curve generation component being configured to determine the positions for each of a first control point and a second control points to lie on a line segment between a first waypoint and a second waypoint of the series of waypoints and to determine the positions of each of an $N^{th}$ control point and a last control point to lie on a line segment between a penultimate waypoint and a final waypoint of the series of waypoints.

3. The system of claim 2, the at least one parameter comprising a maneuver start distance and a maneuver end distance, the curve generation component configured to determine the position of the first control point from at least the maneuver start distance and to determine the position of the last control point from at least the maneuver end distance.

4. The system of claim 1, wherein the at least one parameter comprises a desired distance between the rational Bezier curve and a given waypoint of the series of waypoints, the curve generation component being configured to determine a position of at least one control point from at least the desired distance between the rational Bezier curve and the given waypoint.

5. The system of claim 1, the weight generation component being configured to determine a set of at least two of the scalar weights directly from the at least one parameter, and to determine each of the scalar weights not belonging to the set of at least two scalar weights as one of a default value and a function of the set of at least two of the scalar weights.

6. The system of claim 1, wherein the at least one parameter comprises a corridor width for the propagated route and a desired distance between a given waypoint of the series of waypoints and the extremum point of the rational Bezier curve.

7. The system of claim 1, wherein N is equal to four and the series of waypoints includes three waypoints, and each of the curve generation component and the weight generation component are configured such that the second waypoint falls either of inside of or on the rational Bezier curve.

8. The system of claim 1, wherein the unmanned vehicle is an unmanned air vehicle and the at least one parameter comprises an initial speed and an initial tangential acceleration.

9. A method for generating a maneuver, having an expected duration, on a propagated route for an unmanned vehicle from a series of waypoints and at least one parameter representing constraints on the propagated route of the unmanned vehicle, the method comprising:
   determining scalar weights for a set of N+1 control points from the at least one parameter, where N is an integer greater than three, a set of at least two of the scalar weights being determined directly from the at least one parameter, and each of the scalar weights not belonging to the set of at least two scalar weights as one of a default value and a function of the set of at least two of the scalar weights;
   determining respective positions for each of the set of N+1 control points for a rational Bezier curve of $N^{th}$ order from at least the series of waypoints and the at least one parameter;
   determining a set of points representing the rational Bezier curve from the set of N+1 control points and the scalar weights;
   providing the set of points representing the rational Bezier curve to a control system associated with the unmanned vehicle; and
   executing the maneuver, represented by the set of points representing the rational Bezier curve, at the unmanned vehicle;
   wherein the scalar weights are determined such that an extremum point of the rational Bezier curve occurs halfway through the expected duration and along a median of a triangle defined by a given waypoint of the series of waypoints, a first control point of the set of N+1 control points, and a final control point of the set of N+1 control points.

10. The method of claim 9, the at least one parameter comprising a maneuver start distance and a maneuver end distance, and determining respective positions for each of the set of N+1 control points comprises determining the positions for each of a first control point and a second control points to lie on a line segment between a first waypoint and a second waypoint of the series of waypoints, with the first control point at the maneuver start distance from the second waypoint, and to determine the positions of each of an $N^{th}$ control point and a last control point to lie on a line segment between a penultimate waypoint and a final waypoint of the series of waypoints with the last control point at the maneuver end distance from the second waypoint.

11. The method of claim 9, wherein the at least one parameter comprises a desired distance between the rational Bezier curve and a given waypoint of the series of waypoints, and determining respective positions for each of the set of N+1 control points comprises determining a position of at least one control point from at least the desired distance between the rational Bezier curve and the given waypoint.

12. The method of claim 9, wherein the at least one parameter comprises a maneuver start distance and a maneuver end distance and determining the scalar weights such that the extremum point of the rational Bezier curve occurs halfway through the expected duration comprises determining a scalar weight corresponding to a penultimate control point of the set of N+1 control points as a function of a scalar weight corresponding to a second control point of the set of N+1 control points and a ratio of the maneuver start distance to the maneuver end distance.

13. The method of claim 9, wherein the at least one parameter comprises a corridor width for the propagated route and a desired distance between a given waypoint of the series of waypoints and the extremum point of the rational Bezier curve.

14. A method for generating a maneuver, having an expected duration, on a propagated route for an unmanned air vehicle from a series of three waypoints and at least one parameter, the method comprising:

determining respective positions for each of a set of five control points for a quartic rational Bezier curve from at least the series of three waypoints and a plurality of parameters representing constraints on the propagated route of the unmanned air vehicle, each of the series of three waypoints and the plurality of parameters being provided by a mission planner;

determining scalar weights for the set of five control points from the plurality of parameters, such that an extremum point of the quartic rational Bezier curve occurs halfway through the expected duration and along a median of a triangle defined by a given waypoint of the series of three waypoints, a first control point of the set of five control points, and a final control point of the set of five control points, the scalar weights comprising a first scalar weight, w1, a second scalar weight, w2, and a third scalar weight, w3, a value of the third scalar weight being determined from the values of the first scalar weight, the second scalar weight, a maneuver start distance, d20, and a maneuver end distance, d24, such that $$w3 = \left(w1 + \frac{1}{2}\right)\left(\frac{d20}{d24}\right) - \frac{1}{2};$$

determining a set of points representing the quartic rational Bezier curve from the set of five control points and the scalar weights; and providing the set of points to a control system to control the unmanned air vehicle based on the propagated route.

* * * * *